United States Patent
Roth et al.

(10) Patent No.: US 9,628,875 B1
(45) Date of Patent: Apr. 18, 2017

(54) PROVISIONING A DEVICE TO BE AN AUTHENTICATION DEVICE

(75) Inventors: Gregory B. Roth, Seattle, WA (US);
Nathan R. Fitch, Seattle, WA (US);
Graeme D. Baer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 726 days.

(21) Appl. No.: 13/159,711

(22) Filed: Jun. 14, 2011

(51) Int. Cl.
| | |
|---|---|
| H04L 9/32 | (2006.01) |
| H04K 1/00 | (2006.01) |
| H04B 7/00 | (2006.01) |
| H04Q 5/22 | (2006.01) |
| G06F 15/173 | (2006.01) |

(52) U.S. Cl.
CPC ............ *H04Q 5/22* (2013.01); *G06F 15/173* (2013.01)

(58) Field of Classification Search
CPC ....... H04L 9/3228; H04L 63/08; G06F 21/31; H04W 12/06
USPC ................ 380/279; 726/5; 713/159, 176
See application file for complete search history.

(56) References Cited

U.S. PATENT DOCUMENTS

| | | | |
|---|---|---|---|
| 5,793,966 A | 8/1998 | Amstein et al. | |
| 6,026,166 A | 2/2000 | LeBourgeois | |
| 6,215,877 B1 | 4/2001 | Matsumoto | |
| 6,233,232 B1 | 5/2001 | Chau et al. | |
| 6,324,581 B1 | 11/2001 | Xu et al. | |
| 6,453,354 B1 | 9/2002 | Jiang et al. | |
| 6,957,185 B1 * | 10/2005 | Labaton | 704/500 |
| 6,973,455 B1 | 12/2005 | Vahalia et al. | |
| 6,996,722 B1 * | 2/2006 | Fairman et al. | 713/192 |
| 7,120,631 B1 | 10/2006 | Vahalia et al. | |
| 7,155,035 B2 * | 12/2006 | Kondo | G07C 9/00158 340/5.52 |
| 7,650,509 B1 | 1/2010 | Dunning | |
| 7,685,629 B1 | 3/2010 | White et al. | |
| 7,783,890 B2 * | 8/2010 | Watanabe | 713/181 |
| 7,973,607 B1 * | 7/2011 | Ciaffi et al. | 331/16 |
| 8,112,627 B2 | 2/2012 | Lu et al. | |
| 8,332,323 B2 * | 12/2012 | Stals | G06Q 20/02 235/379 |
| 8,347,374 B2 | 1/2013 | Schneider | |

(Continued)

OTHER PUBLICATIONS

Jae-Jung Kim and Seng-Phil Hong, A Method of Rish Assessment for Multi-factor Authentication, Mar. 2011, Journal of Information Processing Systems, vol. 7, No. 1, p. 187-198.*

(Continued)

*Primary Examiner* — Arvin Eskandarnia
*Assistant Examiner* — Margishi Desai
(74) *Attorney, Agent, or Firm* — Davis Wright Tremaine LLP

(57) ABSTRACT

In certain embodiments, a web services system receives a request to provision a device, such as a telephone, as an authentication device. The web services system initiates display of an image communicating a key to allow the telephone to capture the image and to send key information associated with the key. The web services system receives the key and determines that the key information is valid. In response to the determination, the web services system sends a seed to the telephone to provision the telephone to be an authentication device. The telephone can use the seed to generate one-time passcodes to access a service of the web services system.

29 Claims, 3 Drawing Sheets

(56) References Cited

U.S. PATENT DOCUMENTS

| | | | |
|---|---|---|---|
| 8,443,202 B2 | 5/2013 | White et al. | |
| 8,661,254 B1* | 2/2014 | Sama | H04L 9/3215 380/247 |
| 8,683,564 B2* | 3/2014 | Khan | H04L 9/3228 713/168 |
| 8,745,401 B1* | 6/2014 | Hintz | H04L 9/3226 713/158 |
| 8,838,973 B1* | 9/2014 | Yung | H04L 63/0838 713/165 |
| 2001/0049787 A1* | 12/2001 | Morikawa et al. | 713/156 |
| 2002/0095507 A1* | 7/2002 | Jerdonek | 709/229 |
| 2002/0095569 A1* | 7/2002 | Jerdonek | 713/155 |
| 2002/0099663 A1 | 7/2002 | Yoshino et al. | |
| 2004/0187018 A1* | 9/2004 | Owen | G06F 21/31 713/184 |
| 2004/0228512 A1* | 11/2004 | Warren et al. | 382/137 |
| 2004/0250068 A1* | 12/2004 | Fujisawa | G06Q 20/32 713/168 |
| 2005/0104730 A1* | 5/2005 | Yang | 340/569 |
| 2005/0139680 A1 | 6/2005 | Anttila et al. | |
| 2005/0154896 A1 | 7/2005 | Widman et al. | |
| 2005/0182843 A1 | 8/2005 | Reistad et al. | |
| 2005/0188200 A1 | 8/2005 | Kwok | |
| 2005/0204149 A1* | 9/2005 | Watanabe | A61B 5/1172 713/186 |
| 2005/0251500 A1 | 11/2005 | Vahalia et al. | |
| 2006/0085844 A1 | 4/2006 | Buer et al. | |
| 2006/0126848 A1* | 6/2006 | Park et al. | 380/277 |
| 2006/0136717 A1 | 6/2006 | Buer et al. | |
| 2006/0161774 A1 | 7/2006 | Huh et al. | |
| 2007/0067565 A1 | 3/2007 | Taninaka et al. | |
| 2007/0078938 A1 | 4/2007 | Hu et al. | |
| 2007/0220279 A1 | 9/2007 | Northcutt et al. | |
| 2007/0237332 A1 | 10/2007 | Lyle | |
| 2008/0013724 A1 | 1/2008 | Shamoon et al. | |
| 2008/0034216 A1* | 2/2008 | Law | 713/183 |
| 2008/0034440 A1 | 2/2008 | Holtzman et al. | |
| 2008/0052769 A1 | 2/2008 | Leone et al. | |
| 2008/0077795 A1 | 3/2008 | MacMillan | |
| 2008/0083025 A1 | 4/2008 | Meijer et al. | |
| 2008/0177994 A1* | 7/2008 | Mayer | 713/2 |
| 2008/0209223 A1 | 8/2008 | Nandy et al. | |
| 2009/0094687 A1 | 4/2009 | Jastrebski et al. | |
| 2009/0112753 A1 | 4/2009 | Gupta et al. | |
| 2009/0122149 A1* | 5/2009 | Ishii | 348/222.1 |
| 2009/0132819 A1 | 5/2009 | Lu et al. | |
| 2009/0150156 A1 | 6/2009 | Kennewick et al. | |
| 2009/0249076 A1* | 10/2009 | Reed et al. | 713/181 |
| 2009/0282251 A1 | 11/2009 | Cook et al. | |
| 2009/0285390 A1 | 11/2009 | Scherer et al. | |
| 2009/0287837 A1 | 11/2009 | Felsher | |
| 2009/0307767 A1* | 12/2009 | Semba | 726/18 |
| 2009/0327138 A1 | 12/2009 | Mardani et al. | |
| 2010/0088754 A1* | 4/2010 | Ghislanzoni | 726/9 |
| 2010/0093310 A1 | 4/2010 | Gbadegesin et al. | |
| 2010/0130171 A1 | 5/2010 | Palanigounder et al. | |
| 2010/0131763 A1* | 5/2010 | Kim | H04L 9/0825 713/171 |
| 2010/0186074 A1* | 7/2010 | Stavrou | G06F 21/36 726/7 |
| 2010/0223461 A1* | 9/2010 | Drader | G09C 5/00 713/159 |
| 2010/0235646 A1 | 9/2010 | Fu et al. | |
| 2010/0275010 A1* | 10/2010 | Ghirardi | G06F 21/35 713/155 |
| 2010/0310164 A1* | 12/2010 | Reed et al. | 382/167 |
| 2011/0050926 A1* | 3/2011 | Asano | 348/211.2 |
| 2011/0083009 A1 | 4/2011 | Shamoon et al. | |
| 2011/0209200 A2 | 8/2011 | White et al. | |
| 2011/0276478 A1* | 11/2011 | Hirson et al. | 705/40 |
| 2011/0291797 A1 | 12/2011 | Tessier et al. | |
| 2012/0011370 A1* | 1/2012 | Duke | 713/183 |
| 2012/0060030 A1 | 3/2012 | Lamb | |
| 2012/0066120 A1* | 3/2012 | Ringewald et al. | 705/40 |
| 2012/0084571 A1* | 4/2012 | Weis et al. | 713/184 |
| 2012/0144461 A1* | 6/2012 | Rathbun | 726/5 |
| 2012/0159591 A1* | 6/2012 | Payne | G06F 21/35 726/7 |
| 2012/0276868 A1* | 11/2012 | Martell | 455/406 |
| 2012/0282893 A1* | 11/2012 | Kim et al. | 455/406 |
| 2012/0295580 A1* | 11/2012 | Corner | 455/405 |
| 2012/0300931 A1 | 11/2012 | Ollikainen et al. | |
| 2012/0300938 A1* | 11/2012 | Kean et al. | 380/279 |

OTHER PUBLICATIONS

A. Doherty, et al., *Dynamic Symmetric Key Provisioning Protocol (DSKPP)*; Internet Engineering Task Force (IETF), Request for Comments: 6063, Category: Standards Track, ISSN: 2070-1721, 106 pages, Dec. 2010.

Pending U.S. Appl. No. 13/159,840 entitled "*Securing Multifactor Authentication*", filed Jun. 14, 2011, by Gregory B. Roth, et al., 24 total pages, filed Jun. 14, 2011.

"*Getting Started with 2-Step Verification*", Google Accounts Help, http://www.google.com/support/accounts/bin/static.py?page=guide.cs&guide=1056283&topic=1056285, 2 pages, Printed Jun. 23, 2011.

USPTO, Nonfinal Office Action for U.S. Appl. No. 13/159,840, filed Jun. 14, 2011 by Gregory B. Roth, Jul. 17, 2013.

Gregory B. Roth et al., *Response Pursuant to 37 C.F.R. §1.111*, U.S. Appl. No. 13/159,840, Nov. 18, 2013.

Amazon, "AWS Multi-Factor Authentication," Amazon WebServices, Multi-Factor Authentication, printed Mar. 15, 2011, http://aws.amazon.com/mfa, 2 pages.

Digimarc, "Imperceptible to human senses, Digimarc's digital watermarking technology allows users to embed digital information into audio, images, video and printed materials in a way that is persistent, imperceptible and easily detected by computers and digital devices.", About Digital Watermarking/Digimarc, printed Mar. 15, 2011, https://www.digimarc.com/tech/dwm.asg, 4 pages.

Global Crypto, "Token Authentication," printed Feb. 24, 2011, http://www.globalcrypto.com/token-authentication/, 1 page.

Google, "Google Authenticator", Google Apps Administrator Help, printed Apr. 14, 2011, http://www.google.com/support/a/bin/answer.py?answer=I037451, 2 pages.

Google, "Turning on 2-step verification: Installing Google Authenticator," Google Accounts Help, printed Apr. 18, 2011, http://www.google.com/support/accounts/bin/answer.py?hl=en&answer=10, 7 pages.

Google, "Turning on 2-step verification: Installing Google Authenticator," Google Accounts Help, printed Apr. 18, 2011, http://www.google.com/support/accounts/bin/answer.py?hl=en&answer=10, 1 page.

Patel et al., "Problem Statement for Bootstrapping Mobile IPv6 (MIPv6)", Network Working Group, Request for Comments: 4640, Category: Informational, Sep. 2006, 25 pages.

Phonefactor, "Comparing PhoneFactor to Soft Tokens," printed Feb. 24, 2011, http://www.phonefactor.com/comparing-phonefactor-soft-tokens, 1 page.

Phonefactor, "FAQs/PhoneFactor," printed Feb. 24, 2011, http://www.phonefactor.com/how-it-works-faqs, 3 pages.

Phonefactor, "Two-step authentication verifies user logins," How it Works/PhoneFactor, printed Feb. 24, 2011, http://www.phonefactor.com/how-it-works, 1 page.

Wikipedia, "QR Code," Wikipedia, the free encyclopedia, printed Mar. 15, 2011, http://en.wikipedia.org/wiki/QR_Code, 1 page.

\* cited by examiner

PROVISIONING A DEVICE TO BE AN AUTHENTICATION DEVICE

BACKGROUND

Web service systems may require an entity to be authenticated in order to access a service. Authentication may use one, two, or more independent factors to identify an entity, such as a user. As an example, the user may be required to provide information, such as a passcode. As another example, the user may be required to have a device, such as an authentication device. As yet another example, the user may be required to provide biometric data.

In certain situations, the authentication device may generate information required to access a web service. For example, the authentication device may calculate a one-time passcode that the user enters into a computing system. If the one-time passcode is valid, the user may be able to gain access to the web service through the computing system.

DESCRIPTION OF EXAMPLE EMBODIMENTS

Certain embodiments may provide for efficient and/or effective provisioning of an authentication device. In certain embodiments, a web services system may receive a request to provision a device, such as a telephone, as an authentication device. The web services system may initiate display of an image that communicates a key. The telephone may capture (for example, photograph) the image, extract the key from the image, and then send key information associated with the key to the web services system. If the key information is valid, the web services system may send a seed to the telephone, which the telephone may use to generate one-time passcodes. The embodiments may be more efficient than requiring a user to read the key from an image and then manually input the key information. The embodiments may be more effective if they avoid user error in reading and/or inputting the key information.

Certain embodiments may allow a device to authorize an operation. In the embodiments, a server may receive a request sent by a device to authorize an operation. The device has a seed. Display of an image encoding a challenge code is initiated to allow the device to capture the image and extract the challenge code. A response authorizing the operation is calculated by the device using the challenge code and the seed. The response is sent by the device to the server. In certain examples, the request may be received over a first channel, and the response may be received over a second channel distinct from the first channel. In other examples, the response is displayed by the device and input by the user.

Figure 1:
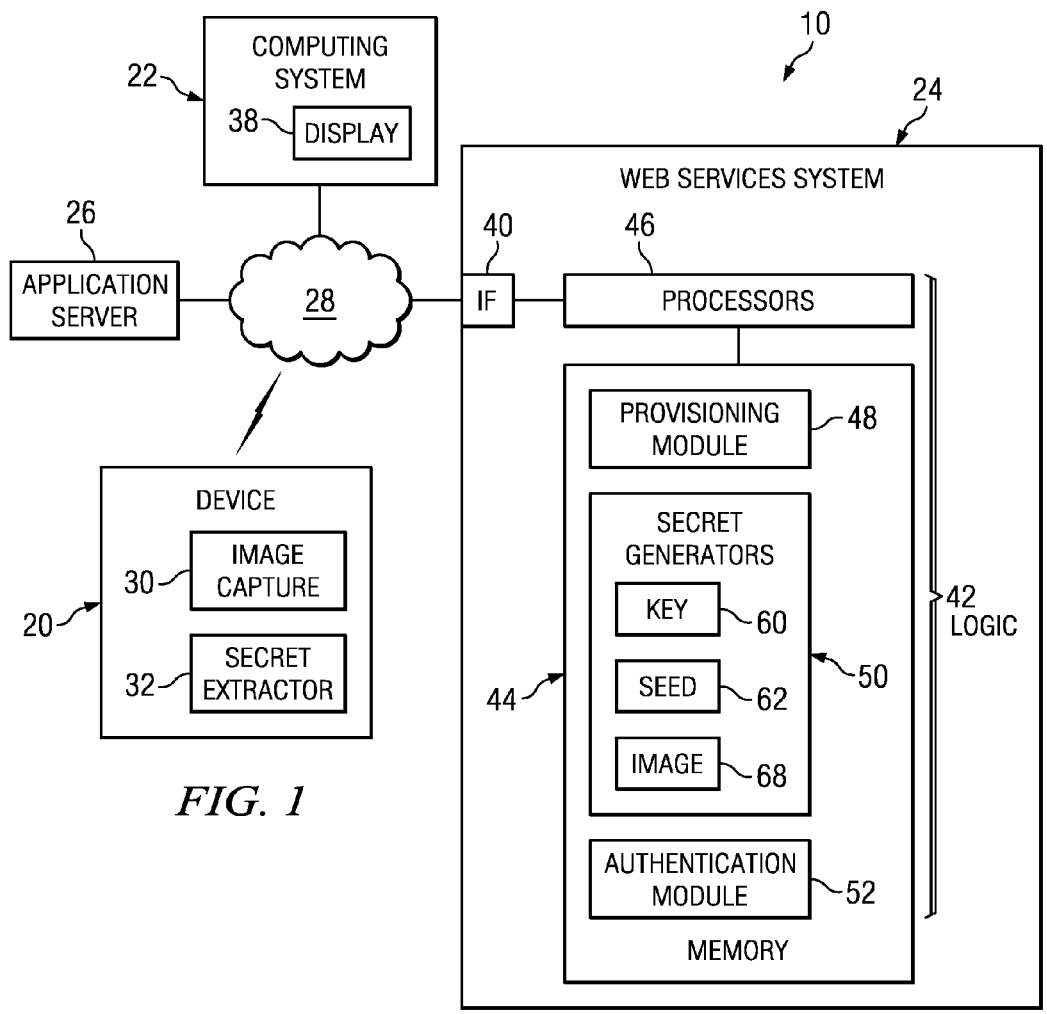
FIG. 1 illustrates an example of a system that may be used to provision a device to be an authentication device and/or allow a device to authorize an operation.

FIG. 1 illustrates an example of a system that may be used to provision a device to be an authentication device and/or allow a device to authorize an operation. In the illustrated example, system 10 includes a device 20, a computing system 22, a web services system 24, an application server 26, and a communication network 28 coupled as illustrated.

In certain embodiments, web services system 24 receives a request to provision device 20, such as a telephone, as an authentication device. Web services system 24 initiates display of an image communicating a key to allow the telephone to photograph the image and to send the key information. Web services system 24 receives the key information and determines that the key information is valid. In response to the determination, web services system 24 sends a seed to the telephone to provision the telephone to be an authentication device. The telephone can use the seed to generate one-time passcodes to access a service of web services system 24.

In certain embodiments, web services system 24 receives a request sent by device 20 to authorize an operation. Web services system 24 initiates display of an image encoding a challenge code to allow device 20 to capture the image and extract the challenge code. Device 20 calculates a response using the challenge code and a seed, and sends the response to web services system 24. In certain examples, device 20 may send the request over a first channel and the response over a second channel distinct from the first channel. In other examples, device 20 displays the response and a user inputs the response into computing system 22.

Web services system 24 may include one or more computing systems that provide a resource or perform an operation. An example of a resource is a system or a web service that provides communication between devices over a communication network. Web services system 24 may control access to the resource by requiring an entity requesting access to provide authentication information. An operation may be performed for a user in response to authorization from the user. Examples of operations include providing a resource to the user and performing transaction on a resource (such as a bank account) of the user.

In the illustrated example, web services system 24 includes an interface (IF) 40, logic 42, and one or more memories 44. Logic 42 includes one or more processors 46 and applications such as a provisioning module 48, secret generators 50, and an authentication module 52. Provisioning module 48 may be used to provision device 20 to be an authentication device to allow device 20 to generate authentication information. Examples of methods for provisioning device 20 are described in more detail with reference to FIGS. 2 and 3.

Secret generators 50 generate secret information, such as authentication information, and then generate an image that can communication the secret information. Examples of authentication information include passcodes, seeds, and key information such as keys. A passcode may be a string of one or more characters that may be used for authentication, for example, to prove identity and/or gain access to a resource. A character may be a unit of information that may correspond to a grapheme or a symbol such as a letter, number, or punctuation mark. Seeds and keys are described in more detail below.

Authentication information may be used for authentication to access a resource, or may be used to calculate or obtain additional authentication information used to access the resource. For example, authentication information may include a passcode, a value used to calculate a passcode, or key information that may be used to retrieve a passcode. In certain embodiments, authentication information may comprise seed information and/or key information. In certain embodiments, a user may be requested to input user authentication information, such as a passcode, a signature, and/or biometric data (such as a fingerprint, a voice sample, and/or facial feature).

In the example, secret generators 50 include a key generator 60 and a seed generator 62. Key generator 60 generates key information that may include a key itself, information used to generate and/or obtain a key, or information generated using a key. A key may be a sequence with pseudo-random characteristics that can be used as an encryption key at one end of communication, and as a decryption key at the other end. Examples of keys include public/private key sets. In certain embodiments, key information may be used to obtain other authentication information, such as a seed. In certain embodiments, a key may be a one-time use key that can be used only once. In other embodiments, a key may be used more than once.

Seed generator 62 generates seed information that may include a seed itself or information used to generate and/or obtain a seed. A seed may be used to calculate one-time passcodes. A one-time (or one-use or single-use) passcode may be a passcode that is valid for a short period of time and/or may be used only once. Techniques for generating passcodes, such as one-time passcodes, from a seed is described in more detail below.

In the example, secret generators 50 also includes an image generator 68. Image generator 68 generates images that communicate authentication information. An image may include one or more frames. For example, an image may be a photograph with one frame or a video with a sequence of frames. An image may include any suitable number of pixels, where each pixel may have any suitable pixel value. For example, an image may have an array of m×n pixels, where each pixel may have a value representing a particular intensity and/or wavelength. As another example, an image may be a sequence of frames, each frame having a set of one, two, or more pixels, where the set of pixels have one of two (or more) possible values, such as a light or dark value.

An image may communicate information in any suitable manner. As an example, an image may be an optical machine-readable representation of information where patterns of the image correspond to particular information. Examples of such images include graphical codes (such as barcodes or quick response (QR) codes) that have particular geometric patterns (such as squares, dots, polygons, bars, or other shapes) that can be optically scanned to obtain the information.

As another example, an image may include a human-readable representation of information that may be captured and translated into machine-readable information using optical character recognition. For example, such an image may include human-readable characters that can be photographed or scanned and translated to machine-readable information.

As another example, an image may include a digital watermark that embeds information into the image via subtle changes to the image data. For example, steganography hides the information within an object that can conceal the information. Steganographic coding may be placed inside of a transport layer, such as a document file, image file, program, or protocol.

In certain embodiments, an image may comprise any suitable sensor data, such as visual data, audio data, and/or other sensor data output by any suitable sensor of an authentication device. For example, an image may comprise sound, with or without a visual image.

An image may communicate any other suitable information that may be extracted by device 20 and may be sent to web services system 24. For example, an image may communicate an account identifier. A user may have different accounts for different vendors, applications, etc. As another example, a website identifier may be communicated to identify the website for which device 20 is requesting access. As another example, an image may include instructions for contacting a server, such as application server 26.

Authentication module 52 authenticates an entity attempting to access a resource of web services system 24. Authentication module 52 may request authentication information to authenticate the entity and may check whether the authentication information is valid. For example, valid key information may be required to obtain a seed, and a one-time passcode generated from the seed may be required to access a resource.

Device 20 may be any suitable device that can be provisioned to be an authentication device. In certain embodiments, device 20 may be a general computing device, which may comprise a computing system. In certain embodiments, device 20 may be a mobile device, which may be a handheld device that can communicate wirelessly. Examples of mobile devices include telephones (such as cellular, mobile, or smart), digital assistants (such as personal or enterprise), and gaming devices. In other embodiments, device 20 may be a dedicated authentication device that has image capture capabilities.

An authentication device may be a hardware security token that generates passcodes such as one-time passcodes. An authentication device may be used with zero, one, or more other independent authentication factors. For example, in addition to information generated by an authentication device, a passcode and/or biometric data may be required in order to access a resource.

In certain embodiments, device 20 may capture an image communicating secret information and/or extract the information from the image to yield authentication information that may be used to access a service of web services system 24. In the illustrated example, device 20 includes an image capture module 30 and a secret extractor 32. An image capture module 30 may include a camera, microphone, and/or scanner. Image capture module 30 may capture an image of an object by recording visible or other light reflected and/or emitted from the object or by recording sound. Image capture module 30 may then output image data generated from the recorded light, which may be used to reproduce and/or analyze the image. Device 20 may or may not have a network connection.

Secret extractor 32 extracts authentication information and may use the authentication information or may calculate additional authentication information from the extracted authentication information to access a service. The additional authentication information may be calculated by applying a mathematical function to the extracted authentication information. In certain embodiments, secret extractor 32 calculates passcodes from a seed by applying a mathematical function to the seed and a parameter that changes. Examples of the changing parameter include a time value (such as a current time), a counter value, a previous passcode, or a challenge code sent by web services system 24.

Computing system 22 may comprise any suitable computing system, and may include one or more interfaces, logic, and one or more memories, which are described in more detail below. Computing system 22 include a display 38, which may be a hardware device that can display an image. In certain embodiments, computing system 22 may receive image data and display an image on display 38 according to the image data.

Application server 26 may be a server that provides applications to device 20. In certain embodiments, application server 26 may be an application store that sells an application to device 20 for payment. In certain situations, it may not be desirable for application server 26 to provide applications that include secret information. Accordingly, device 20 may first obtain the application from application server 26 and then obtain secret information from web services system 24.

Figure 2:
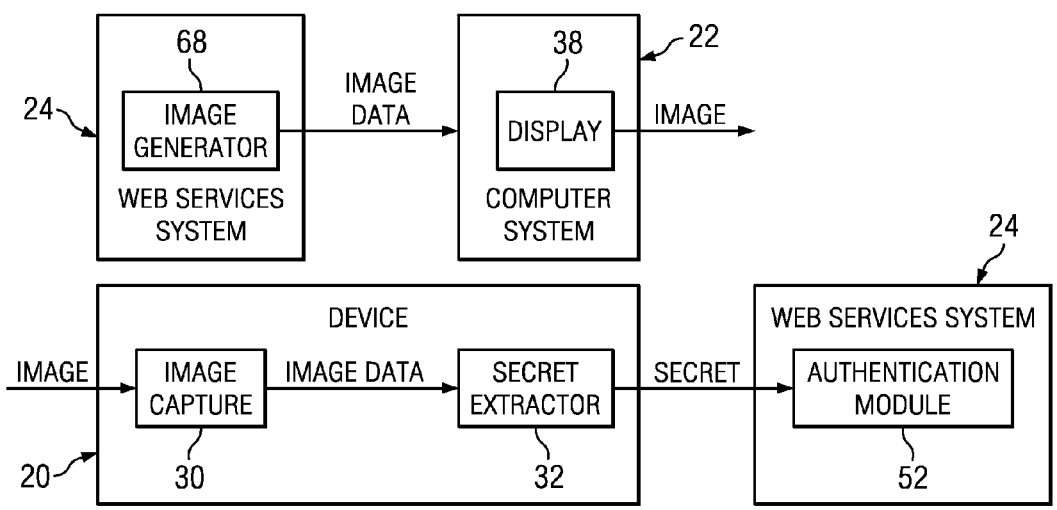
FIG. 2 illustrates an example of an overview of a method for providing authentication information via an image that may be performed by the system of FIG. 1.

FIG. 2 illustrates an example of an overview of a method for providing authentication information via an image that may be performed by the system of FIG. 1. In the example, image generator 68 generates an image that communicates authentication information. Image generator 68 facilitates display of the image by sending image data to computing system 22 to display on display 38. Display 38 displays the image. Image capture module 30 of device 20 captures the image. Secret extractor 32 of device 20 receives the image data and extracts the authentication information from the image data. Device 20 then sends the authentication information to authentication module 52 of web services system 24 in order to facilitate access to a service of web services system.

In certain embodiments, web services system 24 receives a request for certification for device 20 to send messages to a server. The request may be generated by a third-party application on device 20 that sends web service requests to the server. Web services system 24 initiates display of an image communicating certification information to allow the device 20 to photograph the image to use the certification information to send the messages to the server. The certification information may be used by the device to calculate a certification and key information.

In certain embodiments, web services system 24 initiates display of an image communicating a challenge code. Device 20 photographs the image to extract the challenge code. Device 20 calculates a response from the authentication information and the challenge code and sends the response to web services system 24. Web services system 24 may allow access based on the response. The challenge-response may using any suitable protocol, such as the Challenge-Handshake Authentication Protocol (CHAP).

In certain embodiments, a response may be calculated according to a physical feature associated with the device, such as temperature, location, acceleration, and/or other feature of the device or of the environment surrounding the device. For example, a response code may be calculated according to the physical location of the device. The location may be determined by a location detector that detects location using GPS sensing or proximity to networks, such as wireless or Bluetooth networks. In a certain example, the device may refuse to calculate a response outside a particular area.

Figure 3:
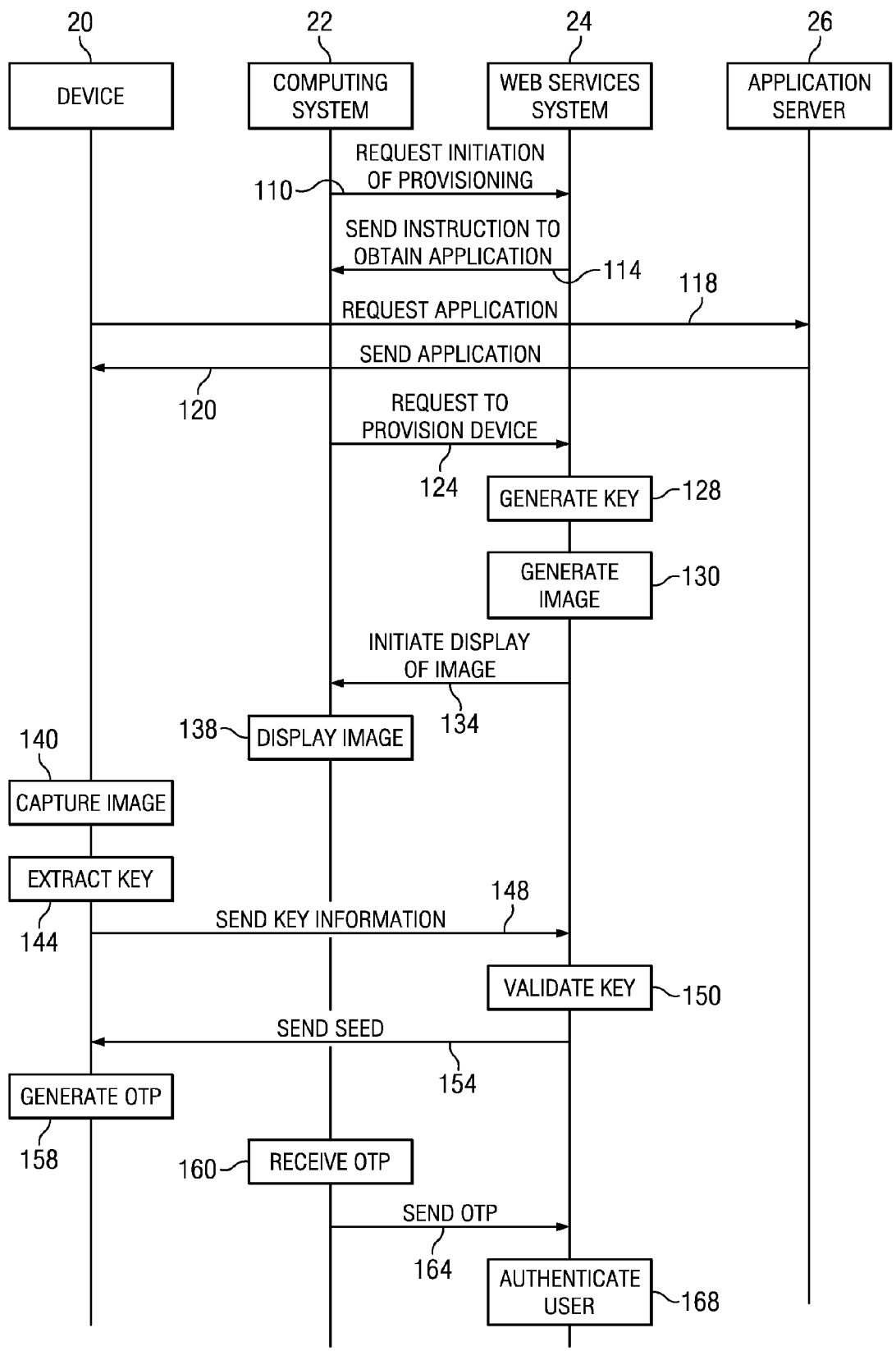
FIG. 3 illustrates an example of a method for provisioning a device to be an authentication device that may be performed by the web services system of FIG. 1.

FIG. 3 illustrates an example of a method for provisioning device 20 as an authentication device. The method may be performed by software downloaded onto device 20 and/or web services system 24 of FIG. 1. In certain embodiments, web services system 24 may comprise one or more computing systems that perform the method. For example, one computing system may perform the method, or one computing system may perform a portion of the method and one or more other computing systems may perform other portions of the method.

Computing system 22 requests initiation of a provisioning process at step 110. For example, a user may use computing system 22 to log onto a website of web services system 24 and to access a security credentials page of the website. Provisioning module 48 of web services system 24 sends an instruction to obtain an authentication device application from application server 26 at step 114. For example, the security credentials page may display an instruction to download the authentication device application and provide the website address of application server 26.

Device 20 requests the application from application server 26 at step 118. For example, device 20 may access application server 26 using the given website address. In some situations, application server 26 may be an application store, so device 20 may provide payment in exchange for the application. Application server 26 sends the application to the authentication device at step 120. In certain embodiments, the application does not include secret information needed to provision device 20 as an authentication device, so device 20 may still need to obtain the secret information.

Computing system 22 sends a request to provision device 20 as an authentication device, and web services system 24 receives the request at step 124. Key generator 60 of web services system 24 generates a key at step 128. For example, key generator 60 may generate a pseudo-random key. Image generator 68 of web services system 24 generates an image that communicates the key at step 130. For example, image generator 68 may generate image data with a digital watermark that can be used to display an image that communicates the key.

Web services system 24 initiates display of the image at step 134. In certain embodiments, display of the image may be initiated by sending image data that can be used by a display to generate the image. For example, image services system 24 may send the image data to computing system 22 to display the image. Display 38 of computing system 22 displays the image at step 138. Image capture module 30 of device 20 captures the image at step 140. For example, device 20 may photograph the image to yield image data. Secret extractor 32 extracts the key at step 144. For example, secret extractor 32 determines the key from the digital watermark of the image data.

Device 20 sends key information associated with the key to web services system 24 at step 148. The key information may include the key itself or a signature calculated from the key. For example, device 20 may send the key information using a web service call. The key information is determined to be valid at step 150. For example, web services system 24 may check that the key information conforms to accepted parameters, has been assigned, and/or has not been previously used. In certain embodiments, steps 148 and 150 may be omitted. In these embodiments, web services system 24 may send a seed that is encrypted under the key information, and device can use the key information to decrypt the seed.

In response to the determination, web services system 24 sends a seed to device 20 at step 154 to provision device 20 as an authentication device. The seed may be used to generate one-time passcodes (OTPs). Device 20 generates a one-time passcode from the seed to access a website of web services system 24 at step 158. For example, device 20 may apply a mathematical function to the seed to generate the one-time passcode.

Computing system 22 receives the one-time passcode at step 160. For example, the user may read the one-time passcode from device 20 and input the one-time passcode into computing system 22. Computing system 22 sends the one-time passcode, and web services system 24 receives the one-time passcode at step 164. Web services system 24 authenticates the user using the one-time passcode at step 168. Web services system 24 may then allow the user to access a service of system 24.

Figure 4:
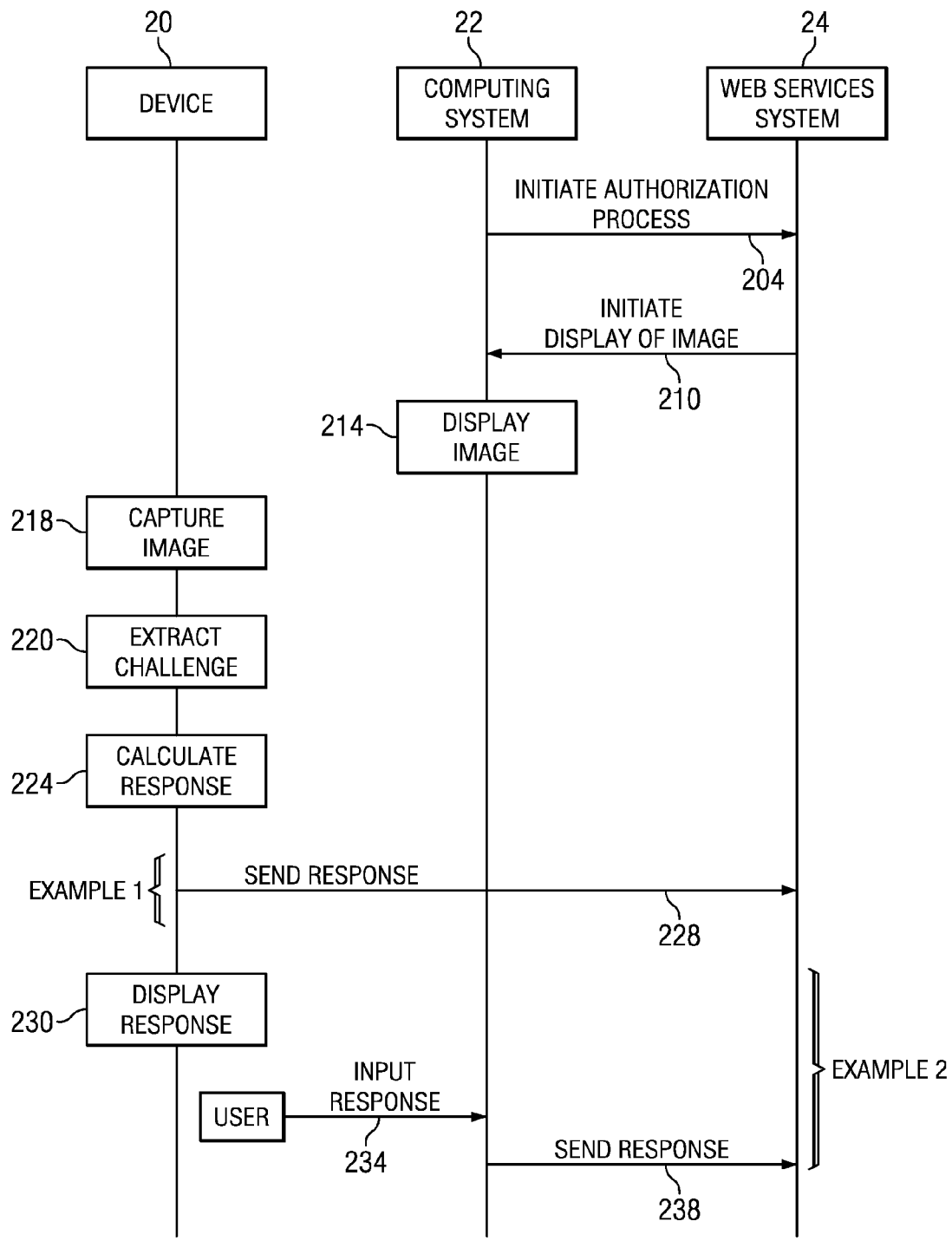
FIG. 4 illustrates an example of a method for allowing a device to authorize an operation that may be performed by the web services system of FIG. 1.

FIG. 4 illustrates an example of a method for allowing device 20 to authorize an operation. The method may be performed by software downloaded onto device 20 and/or web services system 24 of FIG. 1. In certain embodiments, web services system 24 may comprise one or more computing systems that perform the method. For example, one computing system may perform the method, or one computing system may perform a portion of the method and one or more other computing systems may perform other portions of the method. In certain embodiments, device 20 may have a seed, which may have been obtained according to a method described herein.

Computing system 22 requests initiation of authorization of an operation at step 204. For example, a user may use computing system 22 to log onto a website of web services system 24. In certain embodiments, the request may be sent over a first communication channel.

Web services system 24 initiates display of an image communicating a challenge code at step 210. In certain embodiments, display of the image may be initiated by sending image data that can be used by a display to generate the image. For example, image services system 24 may send the image data to computing system 22 to display the image. In certain embodiments, web services system 24 may also initiate display one or more other images. Examples of other images include: a confirmation screen describing the operation that the user is authorizing; a request for a response authorizing the operation; and a request for a user passcode to be input into device 20.

Display 38 of computing system 22 displays the image at step 214. Image capture module 30 of device 20 captures the image at step 218. For example, device 20 may photograph the image to yield image data. Secret extractor 32 extracts the challenge code at step 220. For example, secret extractor 32 determines the challenge code from the digital watermark of the image data. Device 20 calculates a response using the challenge code and the seed at step 224. For example, the response may be calculated according to Digest::SHA256.

Step 228 and steps 230 through 238 describe examples of ways that device 20 can provide the response to web services system 24. As a first example, device 20 sends the response to web services system 24 using a second communication channel that is distinct from the first communication channel. Distinct channels may have one, two or more, or all links that are different. As a second example, device 20 displays the response at step 230. The user reads the response and inputs the response into computing system 22 at step 234. Computing system 22 send the response to web services system 24 at step 238. In certain embodiments, web services system 24 may also receive other information. For example, web services system 24 may receive confirmation that a valid user passcode has been input into device 20.

Under certain circumstances, examples of the method may defend against confused deputy attacks. For example, the user can independently verify the operation being authorized, so a keylogger cannot steal the one-time passcode and relay it to an attacker to perform a different transaction before the user hits enter.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of secret generators 50 and authentication module 52 may be performed by one component, or the operations of authentication module 52 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

In certain embodiments, an entity that performs a first step that precedes (such as leads to) a second step may be regarded as facilitating the second step. For example, if an entity performs step A that precedes step B, the entity also facilitates step B. In certain embodiments, a first entity that performs a first step that precedes a second step that may be performed by a second entity may be regarded as allowing the second entity to perform the second step. For example, if a first entity performs step A that precedes step B that may be performed by a second entity, the first entity also allows the second entity to perform step B.

Systems may include one or more computing systems. A component of the systems and apparatuses disclosed herein (such as a general computing device) may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor (or processing unit) include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory (or memory unit) stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network such as communication network 28. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
   one or more processors;
   memory with instructions that, when executed by the one or more processors, cause the system to:
   receive a request, at an authentication module of the system, to provision a mobile device to be an authentication device;
   provide, to the mobile device, an authentication application that causes the mobile device to generate a one-time passcode usable for authentication,
   cause an image to be displayed on a computing device, wherein the image enables the mobile device to determine first key information by at least analyzing the image displayed on the computing device;
   receive, at the authentication module of the system, the first key information, the received first key information obtained from the mobile device over a network;
   determine, at the authentication module, that the first key information matches key information included in the image;
   in response to the determination, send a seed to the mobile device, the seed useable to generate the one-time passcode useable for authentication;
   obtain, from the computing device, the one-time passcode generated by the mobile device using the seed; and
   allow access to the computing device as a result of receiving the one-time passcode.

2. The system of claim 1, wherein the memory further includes instructions that, when executed by the one or more processors, cause the system to:
   send a challenge code to the mobile device to allow the mobile device to generate a one-time passcode using the challenge code and the seed.

3. The system of claim 1, wherein the memory further includes instructions that, when executed by the one or more processors, cause the system to:
   cause to be displayed on the computing device a next image communicating a challenge code, the next image allowing the mobile device to extract the challenge code in order to calculate a response using the challenge code and the seed.

4. The system of claim 1, wherein the image further comprises at least one of the following:
   a graphical code;
   a digital watermark; and
   a one or more frames.

5. The system of claim 1, wherein the image encodes a one-time use key.

6. The system of claim 1, wherein the memory further includes instructions that, when executed by the one or more processors, cause the system to:
   encode the image with a key; and
   extract the first key information from the image.

7. The system of claim 1, wherein obtaining the one-time passcode further comprises obtaining, from the computing device and over a second network distinct from the network, the one-time passcode.

8. The system of claim 1, wherein obtaining the one-time passcode further comprises obtaining the one-time passcode from the computing device as a result of user input.

9. A computer-implemented method comprising:
   receiving, by one or more processing units, a request to provision a mobile device to be an authentication device that generates one or more one-time passcodes;
   initiating, by the one or more processing units, display of an image on a computing device so that the image communicates authentication information, wherein the image allows the mobile device to extract key information from the authentication information communicated by the image, wherein the key information allows the mobile device to obtain, from an authentication module of a server computer system, a seed for an application of the mobile device to provision the mobile device as the authentication device that can generate the one or more one-time passcodes, and wherein the one or more one-time passcodes enables the mobile device to be used as the authentication device;
   receiving, from the mobile device, the key information;
   determining, by the authentication module, validity of the key information;
   providing to the mobile device the seed; and
   allowing access based at least in part on receiving, from the computing device, a valid one-time passcode generated based at least in part on the seed.

10. The method of claim 9, wherein the computer-implemented method further includes:
    receiving a signature from the mobile device, the signature generated from the key information;
    determining that the signature is valid; and
    sending the seed to the device in response to the determination.

11. The method of claim 9, wherein the computer-implemented method further includes:
    sending the seed encrypted under the key information to the mobile device.

12. The method of claim 9, wherein the computer-implemented method further includes:
    initiating display of a next image on the computing device, the next image communicating a challenge code to allow the mobile device to extract the challenge code from the next image in order to calculate a response using the challenge code and the seed.

13. The method of claim 12, wherein the computer-implemented method further includes:
    receiving a response calculated by the mobile device using the challenge code and the seed; and
    allowing access based at least in part on the response.

14. The method of claim 9, wherein the image is further communicating at least one of the following:
    an account identifier;
    a site identifier; and
    one or more instructions for contacting the server computer system.

15. The method of claim 9, wherein the computer-implemented method further includes:
    initiating display on the computing device a next image communicating a challenge code to allow the mobile device to capture the next image and to extract the challenge code from the next image in order to calculate a response using the challenge code and the seed, the next image communicating an account identifier, a site identifier, or one or more instructions for contacting the server computer system.

16. The method of claim 9, wherein the computer-implemented method further includes:
   transmitting a next image communicating a challenge code to allow the mobile device to extract the challenge code from the next image, the next image communicating an account identifier, a site identifier, or one or more instructions for contacting the server computer system;
   receiving a response calculated by the device using the challenge code and the seed; and
   allowing access based on the response.

17. The method of claim 9, wherein the image comprises at least one of the following:
   a graphical code;
   a digital watermark; and
   a one or more frames.

18. The method of claim 9, wherein the authentication information encodes a key and the key information is derived based at least in part on the key.

19. The method of claim 9, wherein the computer-implemented method further includes:
   receiving, from the computing device, a one-time passcode derived based at least in part on the seed; and
   causing the authentication module to determine validity of the one-time passcode.

20. One or more non-transitory computer-readable media comprising logic that, as a result of execution by one or more processing units, cause operations to be performed comprising:
   sending a request to provision a mobile device to be an authentication device;
   the mobile device capturing an image that communicates information that enables the image to be analyzed to determine a key;
   the mobile device determining, by at least analyzing the image, key information using the key;
   the mobile device transmitting the key information to an authentication module of a computer system to enable the key to be validated;
   receiving, from the authentication module of the computer systems, a seed;
   calculating a one-time passcode based at least in part on the seed; and
   providing the one-time passcode to a computing device to enable the mobile device to be the authentication device.

21. The one or more non-transitory computer-readable media of claim 20, wherein the obtaining a seed using the key information comprises:
   generating a signature from the key information; and
   sending the signature to the authentication module of the computer system to obtain the seed.

22. The one or more non-transitory computer-readable media of claim 20, wherein the determining the seed using the key information comprises:
   receiving the seed from the authentication module of the computer system, the seed being encrypted; and
   decrypting the seed using the key information.

23. The one or more non-transitory computer-readable media of claim 20, wherein the operations further comprise:
   receiving a challenge code; and
   generating a one-time passcode using the challenge code and the seed.

24. The one or more non-transitory computer-readable media of claim 20, wherein the operations further comprise:
   capturing a next image communicating a challenge code; and
   generating a one-time passcode using the challenge code and the seed.

25. The one or more non-transitory computer-readable media of claim 20, wherein the image comprises at least one of the following:
   a graphical code;
   a digital watermark; and
   a one or more frames.

26. The one or more non-transitory computer-readable media of claim 20, wherein the key further includes a one-time use key.

27. The one or more non-transitory computer-readable media of claim 20, wherein the operations further comprise:
   capturing a next image communicating a challenge code; and
   calculating a response to the challenge code according to a physical location of the mobile device.

28. The one or more non-transitory computer-readable media of claim 20, wherein the operations further comprise:
   capturing a next image communicating a challenge code; and
   calculating a response to the challenge code according to a physical feature associated with the mobile device.

29. The one or more non-transitory computer-readable media of claim 20, wherein the image communicating the key includes encoding the key in the image and the key information is derived based at least in part on the key.

* * * * *

UNITED STATES PATENT AND TRADEMARK OFFICE
CERTIFICATE OF CORRECTION

PATENT NO. : 9,628,875 B1
APPLICATION NO. : 13/159711
DATED : April 18, 2017
INVENTOR(S) : Gregory Branchek Roth, Nathan R. Fitch and Graeme David Baer It is certified that error appears in the above-identified patent and that said Letters Patent is hereby corrected as shown below:

In the Specification

Column 3, Lines 31-42:
Web services system 24 initiates display of the image at step 134. In certain embodiments, display of the image may be initiated by sending image data that can be used by a display to generate the image. For example, image services system 24 may send the image data to computing system 22 to display the image. Display 38 of computing system 22 displays the image at step 138. Image capture module 30 of device 20 captures the image at step 140. For example, device 20 may photograph the image to yield image data. Secret extractor 32 extracts the key at step 144. For example, secret extractor 32 determines the key from the digital watermark of the image data.

Should read as:
Web services system 24 initiates display of the image at step 134. In certain embodiments, display of the image may be initiated by sending image data that can be used by a display to generate the image. For example, web services system 24 may send the image data to computing system 22 to display the image. Display 38 of computing system 22 displays the image at step 138. Image capture module 30 of device 20 captures the image at step 140. For example, device 20 may photograph the image to yield image data. Secret extractor 32 extracts the key at step 144. For example, secret extractor 32 determines the key from the digital watermark of the image data.

Column 7, Lines 22-33:
Web services system 24 initiates display of an image communicating a challenge code at step 210. In certain embodiments, display of the image may be initiated by sending image data that can be used by a display to generate the image. For example, image services system 24 may send the image data to computing system 22 to display the image. In certain embodiments, web services system 24 may also initiate display one or more other images. Examples of other images include: a confirmation screen describing the operation that the user is authorizing; a request for a response authorizing the operation; and a request for a user passcode to be input into device 20.

Signed and Sealed this
Fifteenth Day of October, 2024

Katherine Kelly Vidal
*Director of the United States Patent and Trademark Office*

CERTIFICATE OF CORRECTION (continued)
U.S. Pat. No. 9,628,875 B1

Should read as:

Web services system 24 initiates display of an image communicating a challenge code at step 210. In certain embodiments, display of the image may be initiated by sending image data that can be used by a display to generate the image. For example, web services system 24 may send the image data to computing system 22 to display the image. In certain embodiments, web services system 24 may also initiate display one or more other images. Examples of other images include: a confirmation screen describing the operation that the user is authorizing; a request for a response authorizing the operation; and a request for a user passcode to be input into device 20.